: 2,872,995

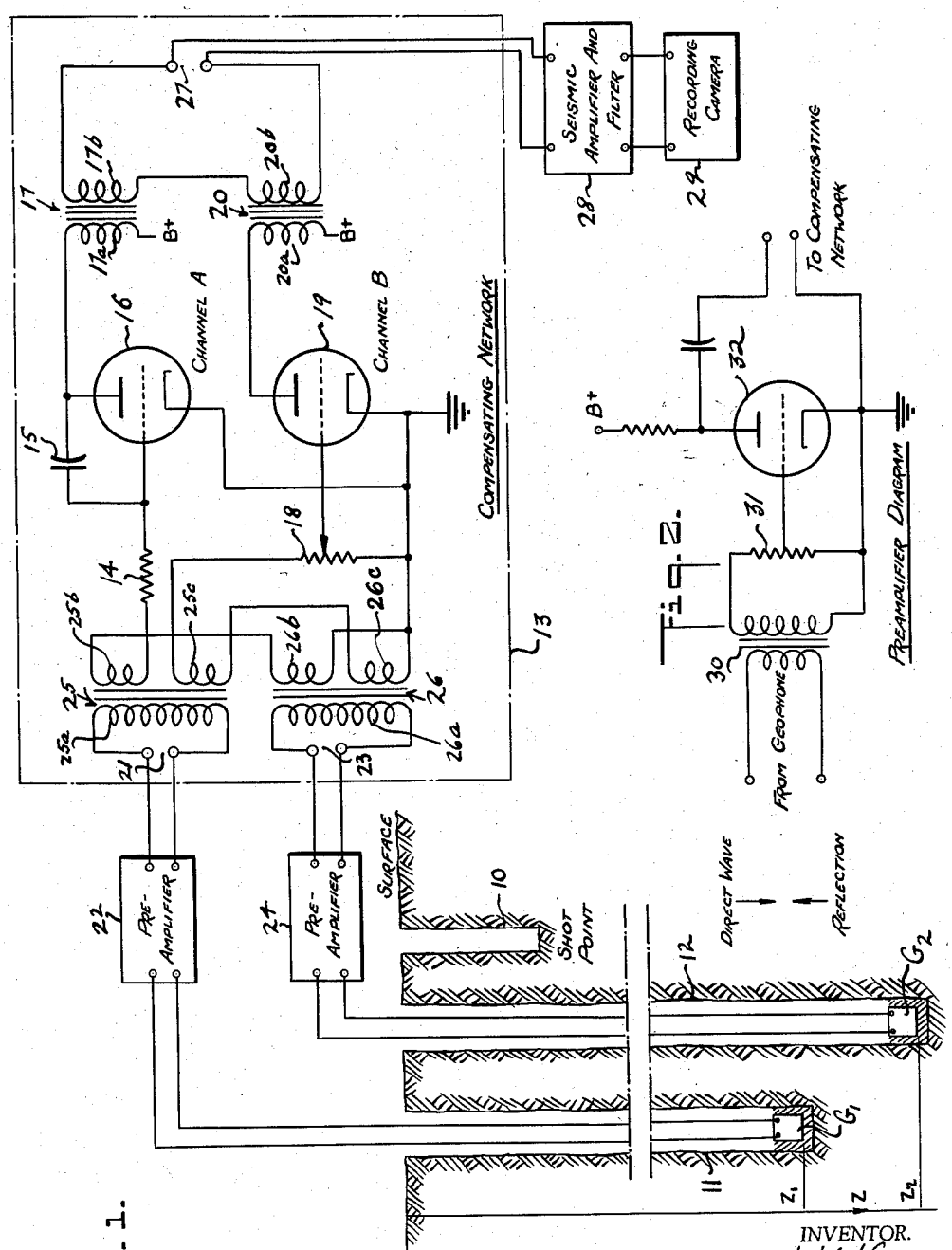

SEISMIC REFLECTION PROSPECTING TECHNIQUE

Alfred Wolf, Tulsa, Okla., assignor to Geophysical Research Corporation, New York, N. Y., a corporation of New Jersey Application May 13, 1957, Serial No. 658,574

8 Claims. (Cl. 181—.5)

The present invention relates generally to geophysical exploration and more particularly to an improved technique and apparatus for conducting seismic reflection prospecting.

In seismic prospecting, it is the usual practice to detonate a charge of explosive from a short point slightly below the surface of the earth. The resulting seismic or acoustic waves are intercepted by a plurality of seismometers or geophones spaced from each other in the neighborhood of the shot point in any one of a number of patterns.

The acoustic waves are picked up after reflection from a formation interface in which a marked change in the velocity of the wave occurs. Each geophone is connected through an amplifier to a recording means and the response of the geophone is indicated as a separate trace on a moving film in a camera, the net result being a graph in which the amplitude of vibration is plotted against time.

To aid in the interpretation of the graph, it has been conventional practice to add the output of two or more individual geophones, the resulting sum being recorded in a single trace on the graph. Where the geophone array is set up on the earth's surface, the surface motion created by the shot tends to interfere with the recording of reflections. If the geophones are buried at some depth below the shot point, a substantial amount of the surface disturbance is eliminated, but earth motion in the proximity of the shot may persist for some time and create a great deal of disturbance at the arrival time of the reflections.

In view of the foregoing, it is the principal object of the invention to provide a method and apparatus for seismic prospecting adapted to minimize undesired components of earth motion at the arrival time of reflections.

More particularly it is an object of the invention to provide a method and apparatus wherein earth motion at some depth directly below the shot point is so recorded as to eliminate waves arriving from above whereby only those waves which travel toward the surface from below the geophone locations are recorded. A significant advantage of the recording technique in accordance with the invention is that it greatly reduces the disturbing effects of earth surface irregularities near the shot point which scatter elastic waves and act as secondary sources.

It is also an object of the invention to provide a seismic recording technique wherein signals generated by two vertically spaced geophones buried at some depth directly below the shot point are fed to a compensating network which combines the signals and feeds them to the seismic amplifier and recorder. The compensating network acts to eliminate the effect of waves proceeding downward from the vicinity of the shot point while at the same time permitting the recording of waves travelling upward, which comprise reflections.

Briefly stated, in a seismic prospecting technique in accordance with the invention, two matched geophones are buried at vertically spaced positions below a shot point, the geophones being responsive only to vertical earth motion. A compensating network is provided which functions to combine additively a first value representing a linear function of a portion of the sum of the outputs of the two geophones with a second value representing a portion of the same linear function of the time integral of the difference of the outputs (low geophone minus upper geophone). By linear function is meant the geophone signal itself, its derivative, integral, combination of signal and differential etc. The relative proportions of the additively combined values are adjusted to annul the effect of direct waves from the shot point, and the resultant output of the compensating network is fed through a suitable amplifier to the seismic recorder.

In the drawing:

Fig. 1 is a schematic diagram of a seismic prospecting apparatus in accordance with the invention.

Fig. 2 is a schematic diagram of the pre-amplifier included in the apparatus shown in Fig. 1.

Referring now to Fig. 1, a shot hole 10 is provided below the surface of the earth. An explosive charge is detonated in the shot hole to create a localized disturbance. Seismic energy is propagated in all directions, and a portion of this energy is reflected upwardly from various strata interfaces or sub-surface beds.

Seismic wave pick-up devices or geophones $G_1$ and $G_2$ are cemented or otherwise held in holes 11 and 12 closely adjacent horizontally to the shot point. The geophones are arranged to respond solely to vertical wave motion. As is well known, the earth is an elastic body and disturbances therein produce waves which are propagated in two distinct modes, namely, the transverse mode and the longitudinal mode. In transverse waves the directions of particle motion is normal to the direction of propagation, whereas in longitudinal waves the particle velocity is parallel to the direction in which the disturbance is spreading.

A shot generates mainly longitudinal waves but these are partly transformed to transverse motion at surfaces of discontinuity. Since the geophones $G_1$ and $G_2$ are responsive to vertical motion only, they do not respond to transverse waves travelling in the vertical direction.

While the geophones $G_1$ and $G_2$ are shown in separate holes, this is not essential to the invention and it is alternatively possible to cement both devices in a common hole or to hold the geophones therein by clamps or similar means. For effective results it is important that the geophones make firm contact with the earth.

In practice, the shot hole 10 may normally be dug to a depth of 50 to 150 ft. Since both geophones are below the surface, this depth is not critical. The geophones are buried preferably at a depth of 300 ft. or more. The deeper the burial the greater the reduction in disturbing earth motion. However this depth is governed by economic considerations and there appears to be little practical advantage in going below 2,000 ft.

The vertical distance of geophone $G_1$ from the surface of the earth is represented in Fig. 1 by the term $z_1$ and the vertical distance of geophone $G_2$ from the surface is represented by $z_2$. The vertical spacing of geophone $G_2$ from geophone $G_1$ ($z_2-z_1$) should be small and it must not exceed a quarter wave length of the shortest earth motion wave which is to be recorded. In most cases a satisfactory value of $z_2-z_1$ is 20 ft. Preferably the geophones are of the well known velocity type in which the output is substantially proportional to the earth velocity, the geophones having a natural frequency of 20 C. P. S., and a damping factor equal to 0.6. The geophones $G_1$ and $G_2$ are of identical construction and produce like electrical outputs for like vibratory inputs.

The respective outputs of geophones $G_1$ and $G_2$ are fed, through preamplifiers, into a compensating network, generally designated by numeral 13, which functions to combine additively a first value constituted by a portion of the sum of the signals with a second value constituted by the time integral of the difference of the signals. By proper adjustment of the proportion of the values being added, the effect of waves proceeding downwardly from the vicinity of the shot point is eliminated so that only reflected waves travelling upwardly are recorded, thereby providing accurate graphical indications.

Compensating network 13 consists essentially of two parallel channels A and B. Channel A includes an integrating network formed by resistor 14 and condenser 15, a triode amplifier tube 16 and an output transformer 17. Channel B includes an adjustable potentiometer 18, a triode amplifier tube 19 and an output transformer 20.

Geophone $G_1$ is connected to one pair of input terminals 21 of the compensator through a pre-amplifier 22, while geophone $G_2$ is connected to another pair of input terminals 23 through a pre-amplifier 24. Input terminals 21 are connected to the primary 25a of a transformer 25, having a pair of secondaries 25b and 25c, while input terminals 23 are connected to the primary 26a of an identically constructed transformer 26, having a pair of secondaries 26b and 26c.

The lower end of secondary 25b is connected through resistor 14 to the grid of tube 16 in channel A, the grid being connected through condenser 15 to the anode of the tube. The upper end of secondary 25b is connected to the upper end of secondary 26b whose lower end is connected to cathode of tube 19 in channel B as well as to cathode of tube 16 in channel A, the cathodes being grounded.

Potentiometer 18 is connected between the upper end of secondary 25c and ground, the adjustable tap thereof being connected to the grid of tube 19 in channel B. The lower end of secondary 25c is connected to the upper end of secondary 26c whose lower end is grounded.

The anode of tube 16 in channel A is connected to the one end of primary 17a of the output transformer 17, the other end of the primary being connected to an anode voltage source. The anode of tube 19 in channel B is connected to one end of the primary 20a of the output transformer 20, the other end of the primary being connected to an anode voltage source.

The transformer ratios of input transformers 25 and 26 are one to one, and the interconnection of the secondaries is such that the sum of the signals from geophones $G_1$ and $G_2$ is applied to the potentiometer 18 in channel B, whereas the difference between the geophone signals ($G_2$ minus $G_1$) is applied to the integrating network 14, 15 in channel A. Secondaries 25c and 26c are serially connected in coincidence, hence the voltages therebetween are added, while secondaries 25b and 26b are connected in serial opposition, hence their voltages are subtracted.

Thus the signal developed across the primary 17a of the output transformer in channel A is proportional to the time integral of the difference of the signals generated by the two geophones. At the same time appearing at the primary of transformer 20a of the output transformer in channel B is a voltage proportional to the sum of the signals generated by the two geophones, the amplitude of this voltage being adjustable by the setting of potentiometer 18.

The secondaries 17b and 20b of the output transformers are connected serially to the output terminals 27 of the compensating network whereby the output of the network is proportional to the sum of the voltages produced by the amplifier channels A and B.

If the signals generated by geophones $G_1$ and $G_2$ are denoted respectively by $e_1$ and $e_2$, the output of the compensating network 13 is proportional to:

$$\int_0^t (e_2-e_1).dt + \tfrac{1}{2}a(e_2+e_1) \qquad (1)$$

where $a$ is a constant depending on the adjustment of potentiometer 18. The value of the total resistance of potentiometer 18 must be much greater than the output resistance of the preamplifiers. This is easily accomplished by the use of one megohm volume control. Similarly resistor 14 in the integrating circuit should have a high value and a one megohm resistor is adequate for this purpose.

The time constant of the integrating circuit is equal to the product of the resistance of resistor 14 and the capacitance of capacitor 15, and the amplification of amplifier 16. A value in excess of one second is quite satisfactory, and this value is easily attained.

The output terminals 27 of compensating network 13 are connected to the usual seismic amplifier 28 which includes the customary filters and automatic volume controls. The output of amplifier 28 is fed to the conventional recording camera 29 and provision is made for indicating the time instant of the shot fired at the shot point 10. The time displacement between this instant and the reception of reflected impulses provides a key to the position of the geophysical discontinuity. The nature of the recording means is more fully disclosed in the text "Geophysical Exploration" of Heiland, pages 614 et seq., Prentice-Hall Inc., 1946.

As pointed out previously, the geophones are of identical construction to provide a matched geophone response. The pre-amplifiers are also of identical construction. Ordinarily their volume controls are set to give equal gain, this being the case when the geophones are buried in material having the same physical properties. When, however, the elastic properties of the earth are different at the two geophone locations, the pre-amplifiers must be set to compensate for this condition, for the amplitude of a seismic wave propagated in a medium in which the elastic properties are a function of position does not remain constant. The term "matched geophones" as used in the specification and claims is meant to include such pre-amplifiers and other devices which may be employed in matching geophone response.

As shown in Fig. 2 the pre-amplifiers consist simply of an input transformer 30 connected through a volume control potentiometer 31 to a resistance-coupled triode amplifier 32, whereby the amplitude of the geophone signal may be adjusted as desired.

It will now be shown that the apparatus as above described does not respond to seismic waves travelling downwards from the shot point, while it is fully responsive to upward propagating waves, provided only that the constant $a$ in Expression 1 is given the proper value by a suitable adjustment of the potentiometer 18. Hence, the operation of this invention generally entails the firing of a series of preliminary shots for various settings of the potentiometer 18 till an adjustment is found for which the amplitude of the direct wave from the shot as recorded by the camera 29 is reduced to a minimum.

These preliminary shots need not be very heavy, for it is not desired to record reflections during this series but only to adjust 18. Caps fired close to the surface of the ground should be sufficiently powerful in most instances. The final step in the operation, after the potentiometer 18 has been finally adjusted, is to fire a regular size charge at the shot point, and to record the reflections without interference from undesired disturbances travelling downward drom the vicinity of the shot.

To explain the results obtainable from this invention some theory of wave propagation must be discussed.

Since the geophones $G_1$ and $G_2$ are buried vertically below the shot point, and as they are responsive only to vertical earth motion, it is sufficient to consider the effects of longitudinal waves only. We introduce a rectangular coordinate system with its origin near the surface, and with the positive z-axis vertically downward. Denoting the time by $t$, the elastic displacement may be written as $w(z, t)$. The geophones being of the velocity type, their output is proportional to $Dw/Dt$, where D is used for partial derivative. Expression 1 for the voltage output of the compensator is then proportional to $$\int_0^t D(w(z_2) - w(z_1))/Dt \cdot dt + \tfrac{1}{2}a(Dw(z_2)/Dt + Dw(z_1)/Dt)$$

carrying out the integration, and with regard to $$w(z_2) - w(z_1) = (z_2 - z_1) \cdot Dw/Dz$$

and $$w(z_2) + w(z_1) = 2w(z)$$

in which $z$ refers to a point midway between the two geophones, the above two equations are very close approximations for $z_2 - z_1$ less than a quarter wave length, we obtain the result that the compensator output is proportional to $$(z_2 - z_1) \cdot Dw/Dz + a \cdot Dw/Dt \tag{2}$$

Next, let the potentiometer 18 be set so as to make $$a/(z_2 - z_1) = 1/V$$

where $V$ is the velocity of propagation of longitudinal elastic waves in the earth at the geophone location. It follows that the output of the compensator may be written as $$E = c(Dw/Dz + (1/V)Dw/Dt) \tag{3}$$

where $c$ is a new constant factor depending on geophone sensitivity and compensator parameters.

It is essential to the above argument that $z_2 - z_1$ be considerably smaller than a quarter of the shortest wave length to be recorded.

The equation of propagation of longitudinal elastic waves near the geophone location is $$V^2 D^2w/Dz^2 = D^2w/Dt^2 \tag{4}$$

of which the most general solution can be written as $$w = f(z + Vt) + g(z - Vt) \tag{5}$$

in which $f$, $g$ are arbitrary functions. The $f$ term on the right-hand side of Equation 5 corresponds to waves travelling upward, including reflections, while the $g$ term corresponding to downward travelling waves represents direct waves from the shot point and disturbances originated by scattering in its vicinity. We have $$Dg/Dz + (1/V)Dg/Dt = g' - (V/V)g' = 0$$

and similarly $$Df/Dz + (1/V)Df/Dt = 2Df/Dz$$

Hence, substituting (5) into (4) we obtain, finally, for the compensator output the equation $$E = 2cDf/Dz = (2c/V)Df/Dt \tag{6}$$

Equation 6 makes it evident that only the effects of reflections and upward travelling waves can appear in the compensator output which is independent of the $g$ function representing downward travelling waves.

The balancing out of $g$ depends on the correct choice of $a$, and is accomplished by adjustment of potentiometer 18.

The compensating network shown in Fig. 1 can be modified in many ways. In particular, the insertion of identical networks in the two parallel paths of the compensator is permissible. This implies that the integrating network 14, 15 may be omitted provided a differentiator is placed in channel B.

If a magnetic recorder is available, the firing of preliminary shots for the purpose of balancing the compensator may be avoided. A recording is made of the $G_1$ and $G_2$ outputs, and the resulting tape is later played back repeatedly through the compensator. The adjustment of 18 is made during the playback.

A record obtained at any shot point according to the present invention is a single trace record. To prospect an area, a series of shot points should be employed preferably spaced at regular intervals along lines crossing the area. A 2000 ft. or ½ mile spacing is very suitable for this purpose. The single trace records thus obtained along a line may be combined into a single record section. To make a record section, a number of the usual seismic records shot along a line crossing the prospective area are reproduced side by side. The reproduction is on a reduced scale so that about 200 traces may appear on a sheet of paper 20 inches wide. In the course of reproduction corrections are applied for weathering and geometrical displacements. The resulting picture presented to the eye is one of subsurface geological structure. The visual effect may be enhanced by reproducing seismic traces in variable density form.

While there has been shown what is considered to be a preferred embodiment of the invention, it is to be understood that many changes and modifications may be made therein without departing from the essential spirit of the invention. It is intended therefore in the appended claims to cover all such modifications as fall within the scope of the invention.

What is claimed is:

1. The method of seismic reflection prospecting comprising the steps of creating an earth disturbance at a shot point, intercepting longitudinal waves resulting from said disturbance at two vertically spaced positions below said shot point, translating said intercepted waves into electrical signals, electrically combining additively a first voltage of a value representing a linear function of a portion of the sum of said signals with a second voltage of a value representing a portion of the same linear function of the time integral of the difference of said signals, and adjusting the relative proportions of said additively combined voltages to annul the effect of direct waves from the shot point.

2. The method of seismic reflection prospecting by means of two matched geophones placed at vertically spaced positions below a shot point and responsive only to vertical earth motion resulting from an explosion at said point, said method comprising the steps of electrically combining additively a first voltage value representing a linear function of a portion of the sum of the outputs of said geophones with a second voltage value representing a portion of the same linear function of the time integral of the difference of the outputs of said geophones, and adjusting the relative proportions of said additively combined voltages to annul the effect of direct waves from the shot point.

3. The method of seismic reflection prospecting by means of two matched geophones placed at vertically spaced positions below a shot point and responsive only to vertical earth motion resulting from an explosion at said point, said method comprising the steps of electrically combining additively a first voltage value representing a linear function of a portion of the sum of the outputs of said geophones with a second voltage value representing a portion of the same linear function of the time integral of the difference of the output of the upper of said geophones from the output of the lower of said geophones, adjusting the relative proportions of said additively combined voltages to annul the effect of direct waves from the shot point, thereby producing a compensated signal indicative of waves reflected from a geophysical discontinuity below said geophones, and recording said compensated signal.

4. Apparatus for reflection seismic prospecting comprising two matched geophones responsive to vertical motion only and adapted to be placed at vertically spaced positions below a shot point; an amplifying and recording device coupled to said geophones; and a compensating network interposed between said geophones and said device for annuling the effect of direct waves from said shot point, said network including two parallel channels, one of said channels having an adjustable volume control therein, means to apply as an input to said one of said channels a voltage representing the sum of the output signals of said geophones, means to apply as an input to said other of said channels a voltage representing the output signal of the lower geophone minus the output of the upper geophone, said other channel incorporating an integrating network, and means additively to combine the outputs of said channels to produce a compensated signal indicative of reflected waves from a geophysical discontinuity below said geophones.

5. A compensating network connected to the outputs of two geophones buried at vertically spaced positions below a shot point, said network being adapted to annul the effect of direct waves from said shot point and comprising two parallel channels, a first of said channels having an adjustable volume control therein, means to apply as an input to said first channel a voltage representing the sum of the output signals of said geophones, and means to apply as an output to the second of said channels a voltage representing the output signal of the lower geophone minus the output of the upper geophone, the second channel incorporating an integrating network, the outputs of said channels being additively connected.

6. A compensating network connected to the outputs of two matched geophones vertically spaced from each other below a shot point, said network being adapted to annul the effect of direct waves from said shot point and comprising two parallel channels each including an amplifier tube, first and second input transformers each having a primary and a pair of secondaries, the primaries of said transformers being connected to respective geophones, means connecting one set of corresponding secondaries of said input transformers in serial opposition and to the input of the amplifier tube of a first of said channels whereby applied thereto is a voltage of a value representing the difference between the outputs of said geophones, means in said first channel to integrate said voltage, means connecting the other set of corresponding secondaries in serial coincidence and to the input of the amplifier tube of a second channel whereby applied thereto is a second voltage of a value representing the sum of said geophone outputs, volume control means in said second channel to adjust the amplitude of said second voltage, and means additively to combine the outputs of said channels.

7. Apparatus for seismic prospecting comprising two identical geophones vertically spaced from each other below a shot point, a recording device, and a compensating network coupling said geophones to said device, said network being adapted to annul the effect of direct waves from said shot point and including two parallel channels each having an amplifier tube, first and second input transformers each having a primary and a pair of secondaries, the primaries of said transformers being connected to respective geophones, means connecting one set of corresponding secondaries of said input transformers in serial opposition and to the input of the amplifier tube of a first of said channels whereby applied thereto is a voltage of a value representing the difference between the outputs of said geophones, means in said first channel to integrate said voltage, means connecting the other set of corresponding secondaries in serial coincidence and to the input of the amplifier tube of a second channel whereby applied thereto is a second voltage of a value representing the sum of said geophone outputs, volume control means in said second channel to adjust the amplitude of said second voltage, and means additively to combine the outputs of said channels to produce a compensated signal for application to said recording device.

8. Apparatus, as set forth in claim 7, further including individual pre-amplifiers interposed between each geophone and the related input transformer for matching the geophone outputs.

References Cited in the file of this patent

UNITED STATES PATENTS

| | | |
|---|---|---|
| 2,087,702 | Peters | July 20, 1937 |
| 2,740,945 | Howes | Apr. 3, 1956 |